(12) United States Patent
Motobe et al.

(10) Patent No.: US 12,420,731 B2
(45) Date of Patent: Sep. 23, 2025

(54) VEHICLE STRUCTURE AND METHOD FOR MANUFACTURING VEHICLE

(71) Applicant: TOYOTA JIDOSHA KABUSHIKI KAISHA, Toyota (JP)

(72) Inventors: Masayuki Motobe, Toyota (JP); Nobuyo Kondo, Toyota (JP); Hiroshi Kawaguchi, Okazaki (JP); Yoshihiko Tsuzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 435 days.

(21) Appl. No.: 18/076,623

(22) Filed: Dec. 7, 2022

(65) Prior Publication Data

US 2023/0226991 A1 Jul. 20, 2023

(30) Foreign Application Priority Data

Jan. 14, 2022 (JP) .................... 2022-004394

(51) Int. Cl.
*B60R 19/34* (2006.01)
*B60R 19/03* (2006.01)
*B60R 19/18* (2006.01)

(52) U.S. Cl.
CPC .............. *B60R 19/34* (2013.01); *B60R 19/03* (2013.01); *B60R 19/18* (2013.01)

(58) Field of Classification Search
CPC ......... B60R 19/03; B60R 19/24; B60R 19/26; B60R 19/34; B60R 19/36; B60R 19/18
USPC ........................................ 293/132, 133, 155
See application file for complete search history.

(56) References Cited

U.S. PATENT DOCUMENTS

| | | | |
|---|---|---|---|
| 6,601,886 B1* | 8/2003 | Thayer | F16F 7/124 293/133 |
| 7,503,603 B2* | 3/2009 | Braunbeck | B60R 19/34 293/133 |
| 9,598,033 B1* | 3/2017 | Berger | B60R 19/18 |
| 10,710,532 B2* | 7/2020 | Kurai | B60R 19/18 |
| 2013/0106139 A1 | 5/2013 | Nagwanshi et al. | |
| 2013/0320685 A1* | 12/2013 | Imamura | B60R 19/24 293/155 |
| 2018/0304841 A1* | 10/2018 | Lu | B60R 19/34 |
| 2019/0111872 A1* | 4/2019 | Newcomb | B60R 19/18 |
| 2019/0118748 A1* | 4/2019 | Newcomb | B60R 19/34 |
| 2019/0135210 A1* | 5/2019 | Kurai | B60R 19/34 |
| 2021/0024022 A1* | 1/2021 | Matecki | B60R 19/03 |
| 2021/0070372 A1 | 3/2021 | Miura | |

(Continued)

FOREIGN PATENT DOCUMENTS

| | | | |
|---|---|---|---|
| DE | 10 2006 041 832 A1 | 3/2008 | |
| DE | 10 2015 115 187 A1 | 3/2017 | |

(Continued)

*Primary Examiner* — Gregory A Blankenship
(74) *Attorney, Agent, or Firm* — Oliff PLC

(57) ABSTRACT

A vehicle structure according to an aspect of the present disclosure includes: a body; a bumper reinforcement disposed at a front or a rear of the body; and a crash box, one end of the crash box being joined to an outer end of the body in a front-rear direction and the other end of the crash box being joined to the bumper reinforcement, in which at least one of the body and the crash box is formed of a resin-coated steel plate, and a resin layer of the resin-coated steel plate is formed on a contact surface between the body and the crash box.

3 Claims, 15 Drawing Sheets

(56) References Cited

U.S. PATENT DOCUMENTS

| | | | | |
|---|---|---|---|---|
| 2022/0048455 A1* | 2/2022 | Aalberg | ................. | B60R 19/18 |
| 2022/0297622 A1* | 9/2022 | Smith | ..................... | B32B 1/00 |
| 2023/0226991 A1* | 7/2023 | Motobe | ................. | B60R 19/03 |
| | | | | 293/133 |
| 2024/0399990 A1* | 12/2024 | McHenry | ............... | B60R 19/34 |

FOREIGN PATENT DOCUMENTS

| | | | |
|---|---|---|---|
| JP | 2010-018061 A | | 1/2010 |
| JP | 2011-063191 A | | 3/2011 |
| JP | 2015-202686 A | | 11/2015 |
| JP | 2020-045059 A | | 3/2020 |
| KR | 10-2009-0101725 A | | 9/2009 |
| KR | 101791589 B1 | | 10/2017 |

\* cited by examiner

VEHICLE STRUCTURE AND METHOD FOR MANUFACTURING VEHICLE

CROSS REFERENCE TO RELATED APPLICATIONS

This application is based upon and claims the benefit of priority from Japanese patent application No. 2022-004394, filed on Jan. 14, 2022, the disclosure of which is incorporated herein in its entirety by reference.

BACKGROUND

The present disclosure relates to a vehicle structure and a method for manufacturing a vehicle.

As disclosed in Japanese Unexamined Patent Application Publication No. 2015-202686, resin-coated steel plates of which surfaces are coated with a resin layer, and hence which have a rust-prevention property are used in automobiles.

SUMMARY

However, resin-coated steel plates are more expensive than ordinary steel plates, so parts in automobiles in which resin-coated steel plates are used need to be carefully chosen.

Regarding a crash box for an automobile, one end thereof is connected to a bumper reinforcement and the other end thereof is connected to the body of the automobile. Note that a method in which a crash box and a bumper reinforcement are assembled onto and joined to a body of an automobile, and then they are electropainted together with the body is preferred in view of productivity and manufacturing cost. However, since the contact surface (the assembling surface) cannot be electropainted, there is a risk of the occurrence of corrosion.

Therefore, for example, a crash box and a bumper reinforcement which are separately electropainted in advance are assembled on a body of an automobile which is also electropainted in advance. Alternatively, a bumper reinforcement which is separately electropainted in advance is assembled onto a crash box which is electropainted together with a body in advance. Therefore, there is a problem that the manufacturing cost increases.

The present disclosure has been made in view of the above-described circumstances, and an object thereof is to provide a vehicle structure capable of suppressing corrosion as well as reducing the manufacturing cost.

A first exemplary aspect is a vehicle structure including:
a body;
a bumper reinforcement disposed at a front or a rear of the body; and
a crash box, one end of the crash box being joined to an outer end of the body in a front-rear direction and the other end of the crash box being joined to the bumper reinforcement, in which
at least one of the body and the crash box is formed of a resin-coated steel plate, and a resin layer of the resin-coated steel plate is formed on a contact surface between the body and the crash box.

In the vehicle structure according to an aspect of the present disclosure, at least one of the body and the crash box is formed of a resin-coated steel plate, and a resin layer of the resin-coated steel plate is formed on the contact surface between the body and the crash box. Owing to the resin layer formed on the contact surface between the crash box and the body, corrosion causing substances hardly reach the steel plate, so that corrosion can be suppressed. That is, it is possible to suppress the corrosion as well as reducing the manufacturing cost.

In the contact surface between the body and the crash box, only the crash box may be formed of the resin-coated steel plate, and a resin layer of the resin-coated steel plate may be formed on the contact surface of the crash box in contact with the body.

Further, the crash box may include a main part of which one end is joined to the bumper reinforcement, and a plate disposed at the other end of the main part and joined to the body; and only the plate of the crash box may be formed of the resin-coated steel plate.

By the above-described configuration, the manufacturing cost can be further reduced.

The resin layer of the resin-coated steel plate may also be formed on a surface thereof opposite to the contact surface in contact with the body, and a thickness of a first resin layer formed on the contact surface may be larger than that of a second resin layer formed on the surface opposite to the contact surface.

Further, the resin layer of the resin-coated steel plate may not be formed on a surface thereof opposite to the contact surface in contact with the body.

By the above-described configuration, the manufacturing cost can be further reduced.

At least one of the bumper reinforcement and the crash box may be formed of a resin-coated steel plate, and a resin layer of the resin-coated steel plate may be formed on a contact surface between the bumper reinforcement and the crash box. Owing to the resin layer formed on the contact surface between the bumper reinforcement and the crash box, corrosion causing substances hardly reach the steel plate, so that corrosion can be suppressed.

Another exemplary aspect is a vehicle structure including:
a body;
a bumper reinforcement disposed at a front or a rear of the body; and
a crash box, one end of the crash box being joined to an outer end of the body in a front-rear direction and the other end of the crash box being joined to the bumper reinforcement, in which
at least one of the bumper reinforcement and the crash box is formed of a resin-coated steel plate, and a resin layer of the resin-coated steel plate is formed on a contact surface between the bumper reinforcement and the crash box.

In the vehicle structure according to an aspect of the present disclosure, at least one of the bumper reinforcement and the crash box is formed of a resin-coated steel plate, and a resin layer of the resin-coated steel plate is formed on the contact surface between the bumper reinforcement and the crash box. Owing to the resin layer formed on the contact surface between the bumper reinforcement and the crash box, corrosion causing substances hardly reach the steel plate, so that corrosion can be suppressed. That is, it is possible to suppress the corrosion as well as reducing the manufacturing cost.

In the contact surface between the bumper reinforcement and the crash box, only the crash box may be formed of the resin-coated steel plate, and a resin layer of the resin-coated steel plate may be formed on the contact surface in contact with the bumper reinforcement.

Further, the crash box may include a main part of which one end is joined to the body, and a plate disposed at the other end of the main part and joined to the bumper reinforcement; and only the plate of the crash box may be formed of the resin-coated steel plate.

By the above-described configuration, the manufacturing cost can be further reduced.

The resin layer of the resin-coated steel plate may also be formed on a surface thereof opposite to the contact surface in contact with the bumper reinforcement, and a thickness of a first resin layer formed on the contact surface may be larger than that of a second resin layer formed on the surface opposite to the contact surface.

Further, the resin layer of the resin-coated steel plate may not be formed on a surface thereof opposite to the contact surface in contact with the bumper reinforcement.

By the above-described configuration, the manufacturing cost can be further reduced.

Another exemplary aspect is a method for manufacturing a vehicle, including electropainting a crash box together with a body and a bumper reinforcement, one end of the crash box being joined to the bumper reinforcement and the other end of the crash box being joined to the body, in which
    at least one of the body and the crash box is formed of a resin-coated steel plate, and a resin layer of the resin-coated steel plate is formed on a contact surface between the body and the crash box.

In the method for manufacturing a vehicle according to an aspect of the present disclosure, at least one of the body and the crash box is formed of a resin-coated steel plate, and a resin layer of the resin-coated steel plate is formed on the contact surface between the body and the crash box. Owing to the resin layer formed on the contact surface between the crash box and the body, corrosion causing substances hardly reach the steel plate, so that corrosion can be suppressed. That is, it is possible to suppress the corrosion as well as reducing the manufacturing cost.

In the contact surface between the body and the crash box, only the crash box may be formed of the resin-coated steel plate, and a resin layer of the resin-coated steel plate may be formed on the contact surface of the crash box in contact with the body. By the above-described configuration, the manufacturing cost can be further reduced.

Another exemplary aspect is a method for manufacturing a vehicle, including electropainting a crash box together with a body and a bumper reinforcement, one end of the crash box being joined to the bumper reinforcement and the other end of the crash box being joined to the body, in which
    at least one of the bumper reinforcement and the crash box is formed of a resin-coated steel plate, and a resin layer of the resin-coated steel plate is formed on a contact surface between the bumper reinforcement and the crash box.

In the method for manufacturing a vehicle according to an aspect of the present disclosure, at least one of the bumper reinforcement and the crash box is formed of a resin-coated steel plate, and a resin layer of the resin-coated steel plate is formed on the contact surface between the bumper reinforcement and the crash box. Owing to the resin layer formed on the contact surface between the bumper reinforcement and the crash box, corrosion causing substances hardly reach the steel plate, so that corrosion can be suppressed. That is, it is possible to suppress the corrosion as well as reducing the manufacturing cost.

In the contact surface between the bumper reinforcement and the crash box, only the crash box may be formed of the resin-coated steel plate, and a resin layer of the resin-coated steel plate may be formed on the contact surface of the crash box in contact with the bumper reinforcement. By the above-described configuration, the manufacturing cost can be further reduced.

According to the present disclosure, it is possible to provide a vehicle structure capable of suppressing corrosion as well as reducing the manufacturing cost.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereafter, specific embodiments to which the present disclosure is applied will be described in detail with reference to the drawings. However, the present disclosure is not particularly limited to the following embodiments. Further, the following descriptions and drawings have been simplified as appropriate for clarifying the explanation.

First Embodiment

Figure 1:
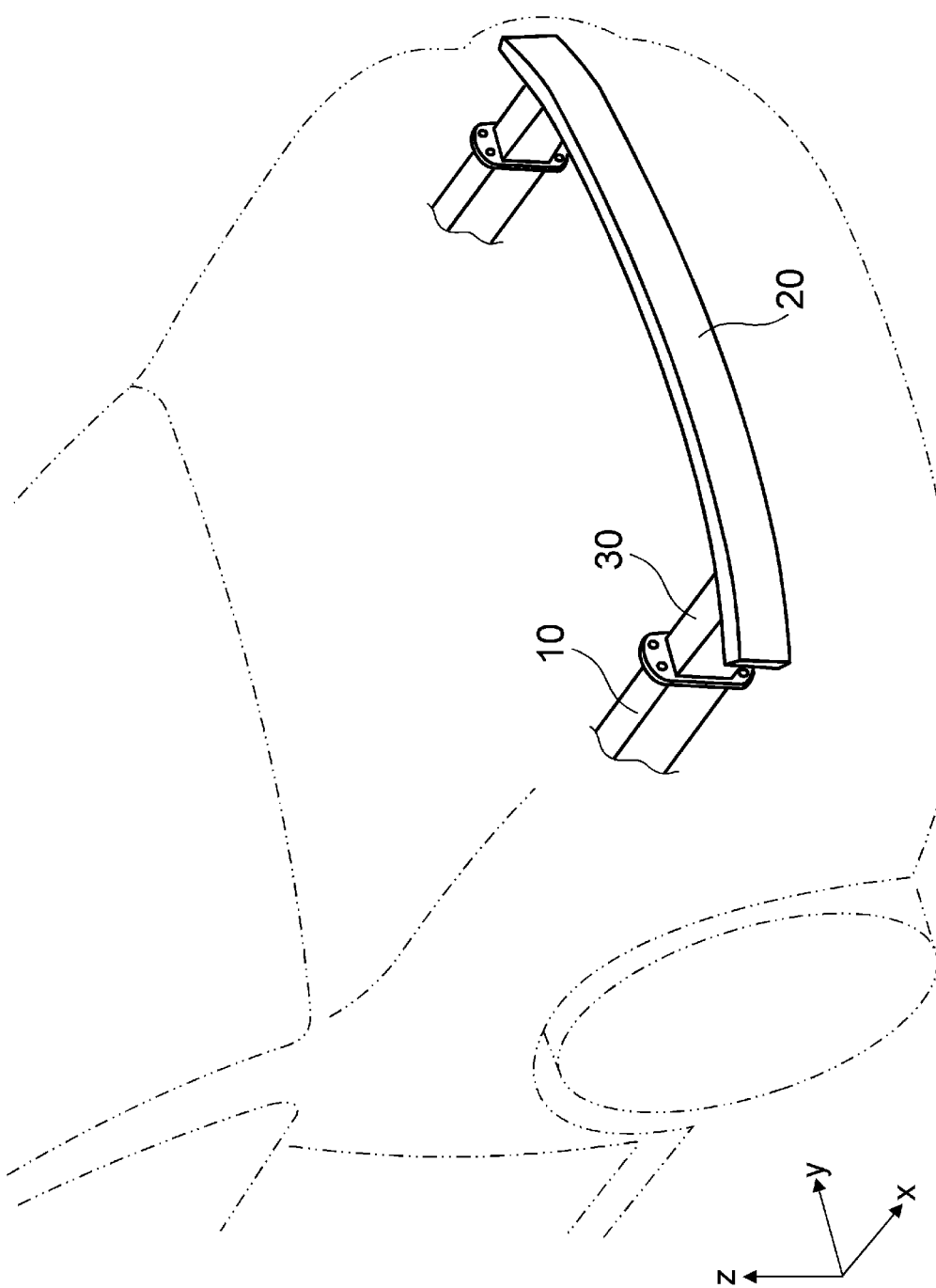
FIG. 1 is a schematic perspective view of a vehicle structure according to a first embodiment.
Figure 2:
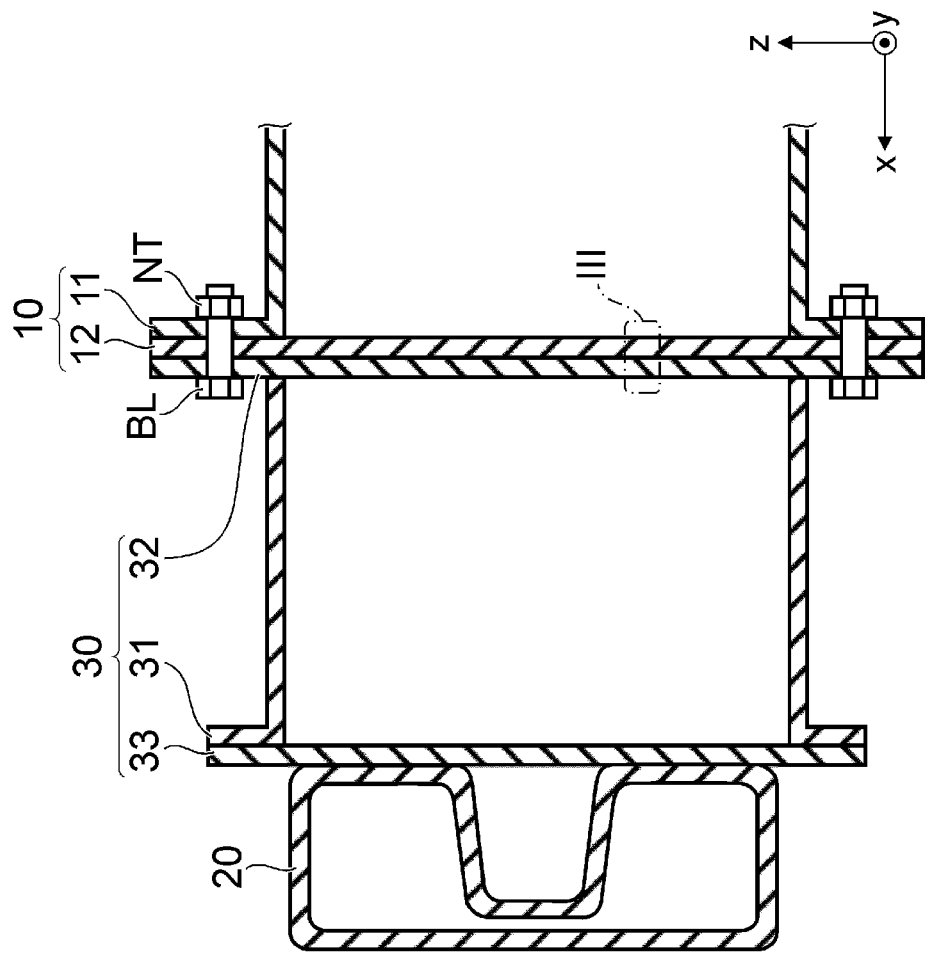
FIG. 2 is a schematic cross-sectional diagram of the vehicle structure according to the first embodiment.

<Configuration of Vehicle Structure>
Firstly, a configuration of a vehicle structure according to a first embodiment will be described with reference to FIGS. 1 and 2. FIG. 1 is a schematic perspective view of the vehicle structure according to the first embodiment. FIG. 2 is a schematic cross-sectional diagram of the vehicle structure according to the first embodiment.

As shown in FIG. 1, the vehicle structure according to this embodiment includes front side members 10, a bumper reinforcement 20, and crash boxes 30 at the front of the vehicle.

Naturally, the right-handed xyz-orthogonal coordinate system shown in FIG. 1 and other figures is the same throughout the drawings, and it is shown just for the sake of convenience in explaining the positional relationships among components. In the example shown in the drawings, the x-axis positive direction indicates the vehicle forward direction; the y-axis direction indicates the vehicle width direction; and the z-axis positive direction indicates the vertical upward direction.

Each of the front side members 10 is, for example, a cylindrical steel plate member constituting a part of the body (i.e., a part of the car body). As shown in FIG. 1, a pair of the front side members 10 extend in the front-rear direction (y-axis direction) on both sides of the front of the body. Each of the front side members 10 has, for example, a rectangular shape on the yz-cross section. Further, the front side member 10 shown in FIG. 2 includes, but is not particularly limited to, a cylindrical main part 11 and a plate 12. A flange part is provided around the front opened end of the main part 11. The flange part of the main part 11 and the plate 12 are joined to each other, for example, by welding or the like so as to close the front opened end of the main part 11.

The bumper reinforcement 20 is a reinforcing member incorporated in a front bumper, and is, for example, a cylindrical steel plate member. As shown in FIG. 1, the bumper reinforcement 20 extends over the entire width of the front of the body (in the y-axis direction). As shown in FIG. 2, the bumper reinforcement 20 has, for example, but is not particularly limited to, a B-shape in the xz-cross section.

Each of the crash boxes 30 is, for example, a box-shaped or cylindrical steel plate member that absorbs, upon a collision, the shock of the collision as the crash box 30 itself collapses. As shown in FIG. 1, a pair of crash boxes 30 are joined to both ends (i.e., one crash box is joined to each end) of the bumper reinforcement 20 in the vehicle width direction (y-axis direction). Further, as shown in FIG. 2, the rear end of each of the crash boxes 30 is joined to the front end of a respective one of the front side members 10, which are parts of the body. The front ends of the crash boxes 30 are joined to the rear ends of the bumper reinforcement 20. That is, one end of each of the crash boxes 30 is joined to a respective one of the outer ends of the body in the front-rear direction, and the other end thereof is joined to the bumper reinforcements 20.

Note that the crash box 30 shown in FIG. 2 includes, but is not particularly limited to, a cylindrical main part 31 and plates 32 and 33. The rear opened end of the main part 31 and the plate 32 are joined to each other, for example, by welding or the like so as to close the rear opened end of the main part 31. Meanwhile, a flange part is provided around the front opened end of the main part 31. The flange part of the main part 31 and the plate 33 are joined to each other, for example, by welding or the like so as to close the front opened end of the main part 31.

Further, as shown in FIG. 2, the front end of the crash box 30, i.e., the plate 33, and the rear end of the bumper reinforcement 20 are joined to each other by welding or the like. Meanwhile, the rear end of the crash box 30, i.e., the plate 32, and the front end of the front side member 10, i.e., the plate 12, are joined to each other by bolting or the like.

Note that in the vehicle structure according to this embodiment, the crash boxes 30, to which the bumper reinforcement 20 has been joined in advance, are assembled onto and joined to the front side members 10, which are parts of the body, by bolting or the like using bolts BL and nuts NT. After that, the body, to which the bumper reinforcement 20 and the crash boxes 30 have been joined, i.e., the vehicle structure according to this embodiment, is electropainted. After the electropainting, for example, intermediate and final coatings may be applied to the vehicle structure.

Figure 3:
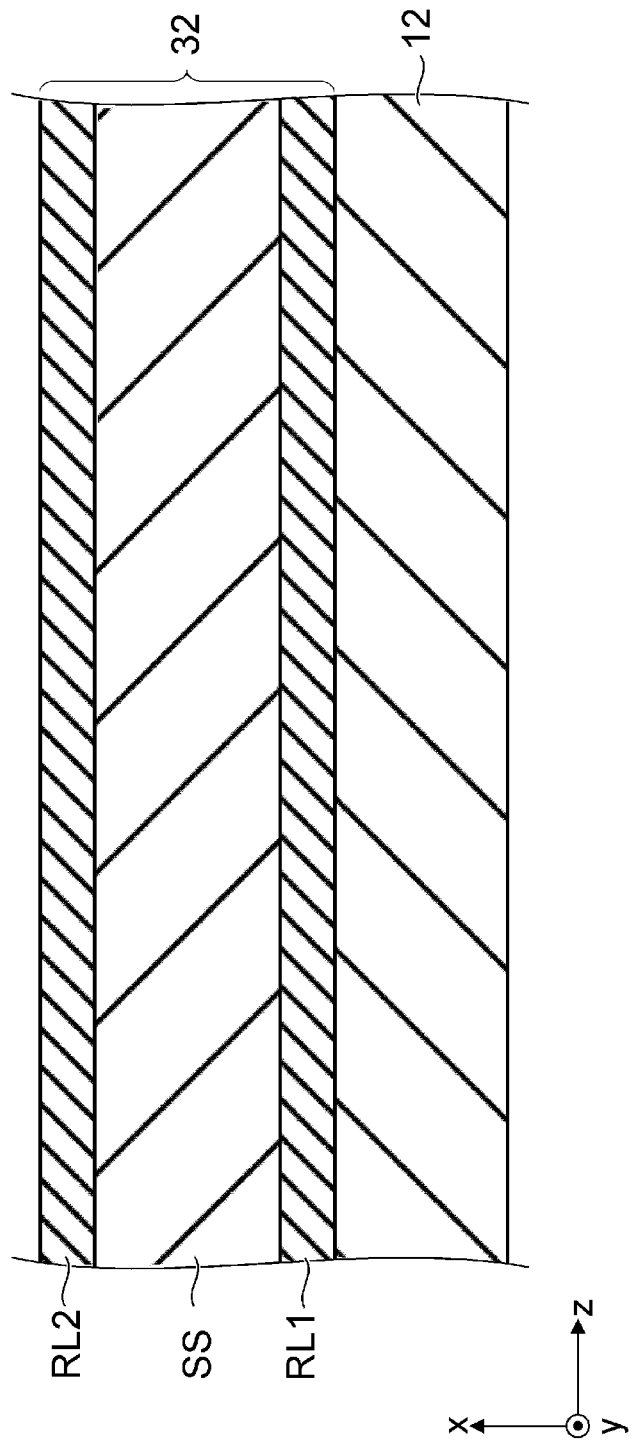
FIG. 3 is a schematic partial cross-sectional diagram of an area III shown in FIG. 2.

Note that FIG. 3 is a schematic partial cross-sectional diagram of an area III shown in FIG. 2. As shown in FIG. 3, the plate 32 of the crash box 30 is formed of a resin-coated steel plate. In the plate 32, the entire rear surface (the surface on the x-axis negative side) of the steel plate SS is coated with a resin layer (first resin layer) RL1, and the entire front surface (the surface on the x-axis positive side) of the steel plate SS is coated with a resin layer (second resin layer) RL2. That is, as shown in FIG. 3, the resin layer RL1 is formed on the contact surface of the plate 32 of the crash box 30 in contact with the plate 12 of the front side member 10.

When the crash box and the bumper reinforcement are assembled onto the body, and then are electropainted together with the body as described above, the contact surface between the crash box and the body cannot be electropainted, and therefore there is a risk of the occurrence of corrosion.

In contrast to this, in the vehicle structure according to this embodiment, as shown in FIG. 3, the plate 32 of the crash box 30 is formed of a resin-coated steel plate, and a resin layer RL1 is formed on the contact surface of the plate 32 in contact with the plate 12 of the front side member 10.

Therefore, owing to the resin layer RL1, corrosion causing substances such as water, oxygen, and chlorine hardly reach the steel sheet SS of the plate 32, and the plate 12, which is made of a steel plate, so that it is possible to suppress corrosion on the contact surface (the assembling surface) between the crash box 30 and the front side member 10 (i.e., the body). As will be described later, when the resin layer RL1 contains a rust-prevention pigment, the corrosion can be further suppressed.

Therefore, by assembling the crash box 30 onto the front side member 10 (i.e., the body) and then electropainting them, it is possible to suppress the corrosion on the contact surface (assembling surface) between them as well as reducing the manufacturing cost.

Note that the steel plate SS is made of, but is not particularly limited to, ordinary steel or steel containing an additive element(s) such as chromium. Further, a plating film may be provided on the surface of the steel plate SS in order to enhance the rust-prevention property. That is, the steel plate SS may be a plated steel plate. Examples of the plating film include, but are not particularly limited to, a plating film containing any one of metallic elements such as zinc, aluminum, cobalt, tin and nickel, and an alloy plating film containing at least one of these metallic elements.

Further, each of the resin layers RL1 and RL2 are made of, but are not particularly limited to, an organic resin such as a water-based coating composition or an organic solvent-based coating composition. Examples of the organic resin include polyurethane resins, polyester resins, epoxy resins, (meth)acrylic resins, polyolefin resins, denatured resins thereof, and mixtures thereof.

The organic resin contains, for example, a rust-prevention pigment and has a rust-prevention property. The rustproof pigment contains, but are not limited to, fine particles of at least one of, for example, a silicate compound, a phosphate compound, a vanadate compound, and a metal oxide. The rustproof pigment is, for example, nanoparticles having a volume-average diameter of about 1 to 50 nm, fine particles having a volume-average diameter of about 0.5 to 10 μm, or a mixture of them. The amount of the rust-prevention pigment added in each of the resin layers RL1 and RL2 may be, for example, 1 to 40 volume % or 2 to 20 volume %.

Further, the organic resin may contain, for example, a conductive pigment and hence may be conductive. The conductive pigments include, but are not particularly limited to, fine particles of at least one of, for example, a metal, an alloy, conductive carbon, iron phosphide, a carbide, and a semiconductor oxide. The volume-average diameter of the fine particles is, for example, about 0.5~to 10 μm. The amount of the added conductive pigment in each of the resin layers RL1 and RL2 may be, for example, 1 to 40 volume % or 2 to 20 volume %.

The thickness of each of the resin layers RL1 and RL2 is, for example, 0.5 to 10 μm. Since the thickness of each of the resin layers RL1 and RL2 is 0.5 μm or larger, a corrosion resistance can be obtained. Further, since the thickness of each of the resin layers RL1 and RL2 is 10 μm or smaller, destruction or delamination of the resin layers RL1 and RL2 can be suppressed during the press forming and the like. The thickness of each of the resin layers RL1 and RL2 may be, for example, 1 to 5 μm.

The thicknesses of the resin layers RL1 and RL2 are, for example, roughly equal to each other. However, the thickness of the resin layer RL1 formed on the contact surface of the plate 32 of the crash box 30 in contact with the plate 12 of the front side member 10 may be larger than that of the resin layer RL2 formed on the surface opposite to the contact surface.

Further, the resin layer RL1 may be formed only on the contact surface of the plate 32 of the crash box 30 in contact with the plate 12 of the front side member 10, and the resin layer RL2 may not be formed on the surface opposite to the contact surface. By the above-described configuration, it is possible to further reduce the manufacturing cost as well as suppressing the corrosion on the contact surface between the plate 32 of the crash box 30 and the plate 12 of the front side member 10.

Further, as long as the resin layer RL1 is formed on the contact surface of the plate 32 of the crash box 30 in contact with the plate 12 of the front side member 10, the resin layer RL1 does not necessarily have to be formed on the entire surface of the plate 32 in which the aforementioned contact surface is included.

Note that in order to improve the adhesion of each of the resin layers RL1 and RL2 to the steel plate SS, the corrosion resistance thereof, and the like, an undercoating film may be provided between each of the resin layers RL1 and RL2 and the surface of the steel plate SS. The number of layers and the composition of the undercoating film are not limited to any particular numbers and any particular compositions.

Further, although no resin layer is formed on the end face of the steel plate SS in the crash box for an automobile (hereinafter also referred to as an automotive crash box) according to this embodiment, a resin layer may be formed on the end face of the steel plate SS.

As described above, in the vehicle structure according to this embodiment, the plate 32 of the crash box 30 is formed of a resin-coated steel plate, and the resin layer RL1 is formed on the contact surface of the plate 32 in contact with the plate 12 of the front side member 10. Therefore, by assembling the crash box 30 onto the front side member 10 (i.e., the body) and then electropainting them, it is possible to suppress the corrosion on the contact surface (assembling surface) between them as well as reducing the manufacturing cost. That is, it is possible to suppress the corrosion as well as reducing the manufacturing cost.

Modified Example

Figure 4:
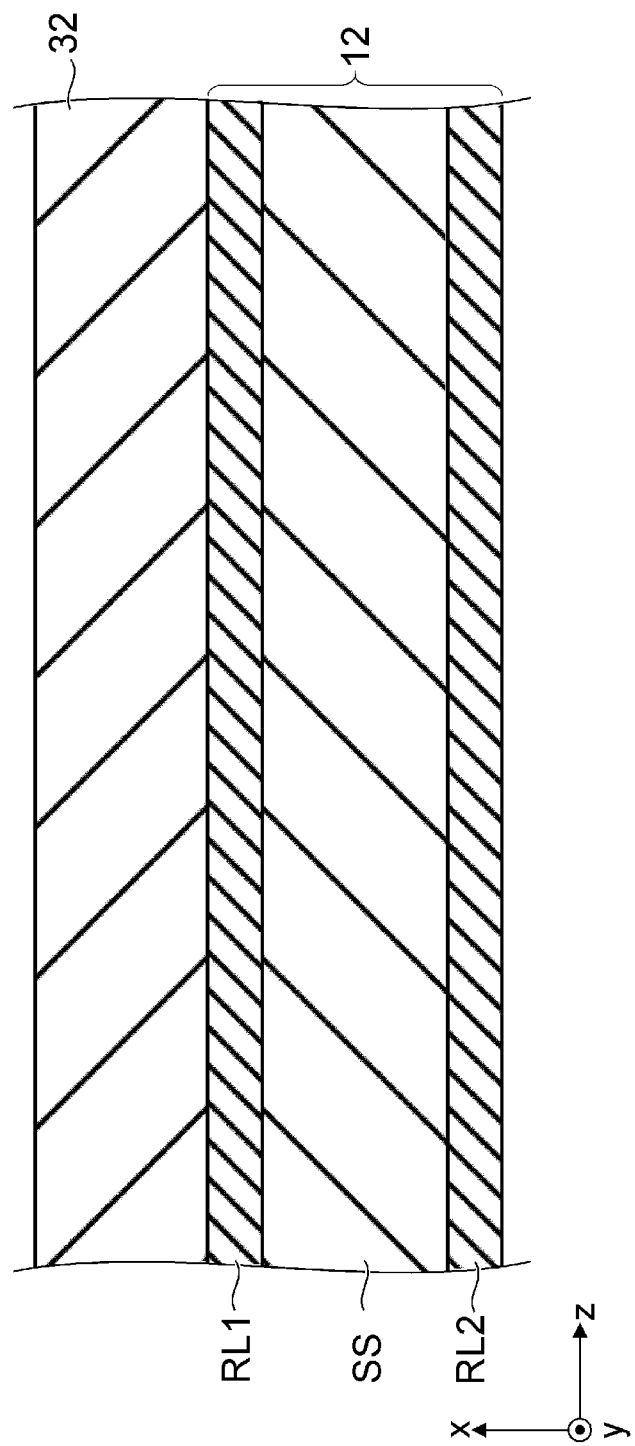
FIG. 4 is a schematic partial cross-sectional diagram of a vehicle structure according to a modified example of the first embodiment.

A vehicle structure according to a modified example of this embodiment will be described hereinafter with reference to FIG. 4. FIG. 4 is a schematic partial cross-sectional diagram of the vehicle structure according to the modified example of the first embodiment. FIG. 4 is a cross-sectional diagram corresponding to FIG. 3.

As shown in FIG. 4, in the vehicle structure according to the modified example, the plate 12 of the front side member 10, instead of the plate 32 of the crash box 30, is formed of a resin-coated steel plate.

As shown in FIG. 4, in the plate 12 of the front side member 10, the entire front surface (the surface on the x-axis positive side) of the steel plate SS is coated with a resin layer RL1, and the entire rear surface (the surface on the x-axis negative side) of the steel plate SS is coated with a resin layer RL2. That is, as shown in FIG. 4, the resin layer RL1 is formed on the contact surface of the plate 12 of the front side member 10 in contact with the plate 32 of the crash box 30.

Therefore, owing to the resin layer RL1, corrosion causing substances such as water, oxygen, and chlorine hardly reach the steel sheet SS of the plate 12, and the plate 32, which is made of a steel plate, so that it is possible to suppress corrosion on the contact surface (assembling surface) between the crash box 30 and the front side member 10 (i.e., the body).

Therefore, even in the vehicle structure according to the modified example, by assembling the crash box 30 onto the front side member 10 (i.e., the body) and then electropainting them, it is possible to suppress the corrosion on the contact surface (assembling surface) between them as well as reducing the manufacturing cost.

Note that, in the vehicle structure according to this embodiment, it is sufficient if at least one of the front side member 10 and the crash box 30 is formed of a resin-coated steel plate, and a resin layer of this resin-coated steel plate is formed on the contact surface between the front side member 10 and the crash box 30. That is, both the front side member 10 and the crash box 30 may be formed of a resin-coated steel plate.

However, it is possible to reduce the manufacturing cost by forming only one of the front side member 10 and the crash box 30 from a resin-coated steel plate and forming the other of them from an ordinary steel plate coated with no resin. Further, as shown in FIG. 3, the manufacturing cost can be further reduced by forming only the plate 32 of the crash box 30 from a resin-coated steel plate and forming the main part 31 and the plate 33 from an ordinary steel plate coated with no resin. Alternatively, as shown in FIG. 4, the manufacturing cost can be further reduced by forming only the plate 12 of the front side member 10 from a resin-coated steel plate and forming the main part 11 from an ordinary steel plate coated with no resin.

Second Embodiment

Figure 5:
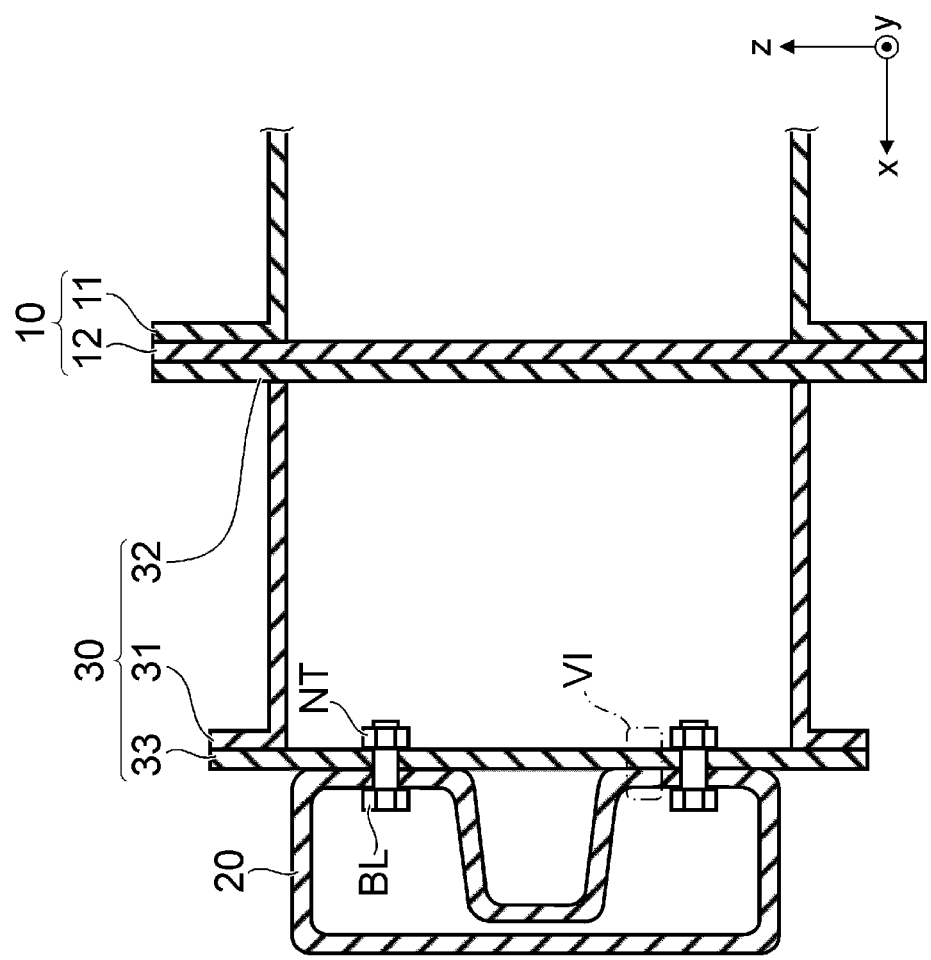
FIG. 5 is a schematic cross-sectional diagram of a vehicle structure according to a second embodiment.

Next, a configuration of a vehicle structure according to a second embodiment will be described with reference to FIG. 5. FIG. 5 is a schematic cross-sectional diagram of the vehicle structure according to the second embodiment. FIG. 5 is a cross-sectional diagram corresponding to FIG. 2.

As shown in FIG. 5, similarly to the vehicle structure according to the first embodiment, the vehicle structure according to this embodiment includes a front side member(s) 10, a bumper reinforcement 20, and a crash box(es) 30.

Note that as shown in FIG. 2, in the vehicle structure according to the first embodiment, the front end of the crash box 30, i.e., the plate 33, and the rear end of the bumper reinforcement 20 are joined to each other by welding or the like. In contrast, the rear end of the crash box 30, i.e., the plate 32, and the front end of the front side member 10, i.e., the plate 12, are joined to each other by bolting or the like.

That is, in the vehicle structure according to the first embodiment, the crash box 30 to which the bumper reinforcement 20 has been joined in advance is assembled onto and joined to the front side member 10, which is a part of a body, by bolting or the like using bolts BL and nuts NT. After that, the body, to which the bumper reinforcement 20 and the crash box 30 have been joined, i.e., the vehicle structure according to this embodiment, is electropainted.

In contrast, as shown in FIG. 5, in the vehicle structure according to the second embodiment, the front end of the crash box 30, i.e., the plate 33, and the rear end of the bumper reinforcement 20 are joined to each other by bolting or the like. Meanwhile, the rear end of the crash box 30, i.e., the plate 32, and the front end of the front side member 10, i.e., the plate 12, are joined to each other by welding or the like.

That is, in the vehicle structure according to this embodiment, the bumper reinforcement 20 is assembled onto and joined to the crash box 30, which has been joined to the front side member 10 (i.e., a part of the body) in advance, by bolting or the like using bolts BL and nuts NT. After that, the body, to which the bumper reinforcement 20 and the crash box 30 have been joined, i.e., the vehicle structure according to this embodiment, is electropainted.

Figure 6:
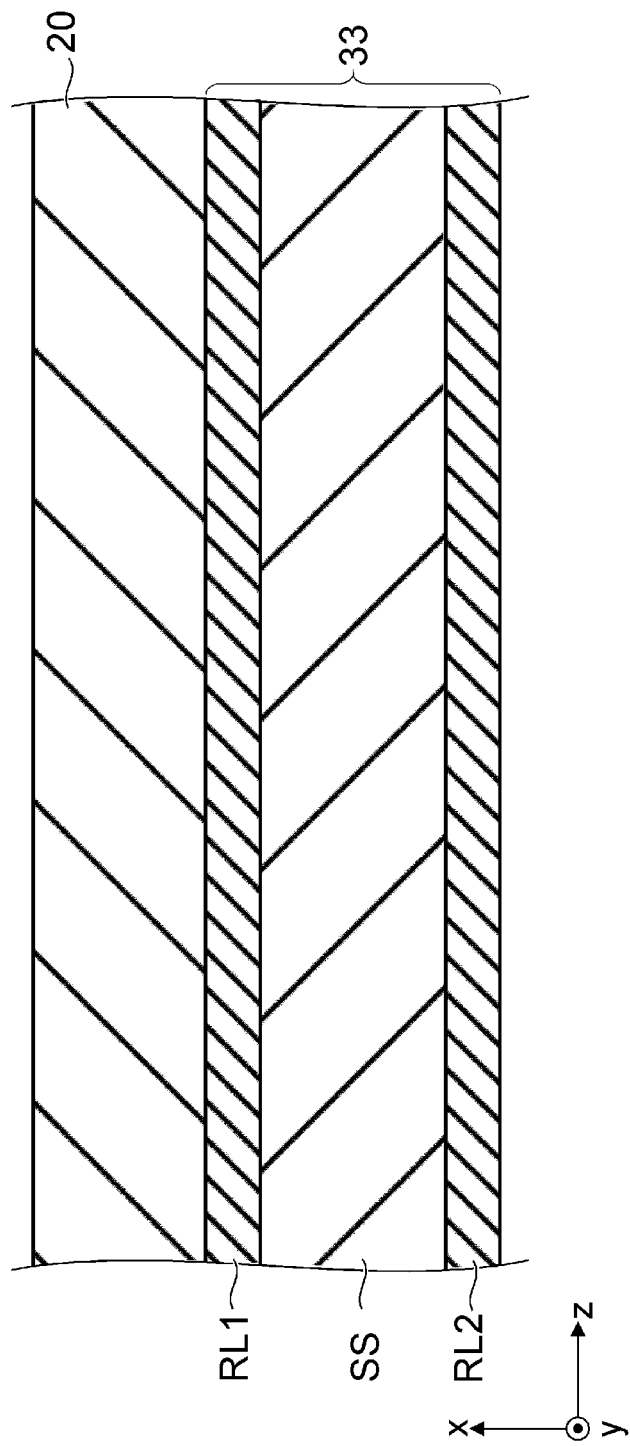
FIG. 6 is a schematic partial cross-sectional diagram of an area VI shown in FIG. 5.

Note that FIG. 6 is a schematic partial cross-sectional diagram of an area VI shown in FIG. 5. As shown in FIG. 6, the plate 33 of the crash box 30 is formed of a resin-coated steel plate. In the plate 33, the entire front surface (the surface on the x-axis positive side) of the steel plate SS is coated with a resin layer RL1, and the entire rear surface (the surface on the x-axis negative side) of the steel plate SS is coated with a resin layer RL2. That is, as shown in FIG. 6, the resin layer RL1 is formed on the contact surface of the plate 33 of the crash box 30 in contact with the bumper reinforcement 20.

Therefore, owing to the resin layer RL1, corrosion causing substances such as water, oxygen, and chlorine hardly reach the steel sheet SS of the plate 33, and the bumper reinforcement 20, which is made of a steel plate, so that it is possible to suppress corrosion on the contact surface (assembling surface) between the crash box 30 and the bumper reinforcement 20.

Therefore, by assembling the bumper reinforcement 20 onto the crash box 30 and then electropainting them, it is possible to suppress the corrosion on the contact surface (assembling surface) between them as well as reducing the manufacturing cost.

The thicknesses of the resin layers RL1 and RL2 are, for example, roughly equal to each other. However, the thickness of the resin layer RL1 formed on the contact surface of the plate 33 of the crash box 30 in contact with the bumper reinforcement 20 may be larger than that of the resin layer RL2 formed on the surface opposite to the contact surface.

Further, the resin layer RL1 may be formed only on the contact surface of the plate 33 of the crash box 30 in contact with the bumper reinforcement 20, and the resin layer RL2 may not be formed on the surface opposite to the contact surface. By the above-described configuration, it is possible to further reduce the manufacturing cost as well as suppressing the corrosion on the contact surface between the plate 33 of the crash box 30 and the bumper reinforcement 20.

Further, as long as the resin layer RL1 is formed on the contact surface of the plate 33 of the crash box 30 in contact with the bumper reinforcement 20, the resin layer RL1 does not necessarily have to be formed on the entire surface of the plate 33 in which the aforementioned contact surface is included.

As described above, in the vehicle structure according to this embodiment, the plate 33 of the crash box 30 is formed of a resin-coated steel plate, and the resin layer RL1 is formed on the contact surface of the plate 33 in contact with the bumper reinforcement 20. Therefore, by assembling the bumper reinforcement 20 onto the crash box 30 and then electropainting them, it is possible to suppress the corrosion on the contact surface (assembling surface) between them as well as reducing the manufacturing cost. That is, it is possible to suppress the corrosion as well as reducing the manufacturing cost.

Modified Example

Figure 7:
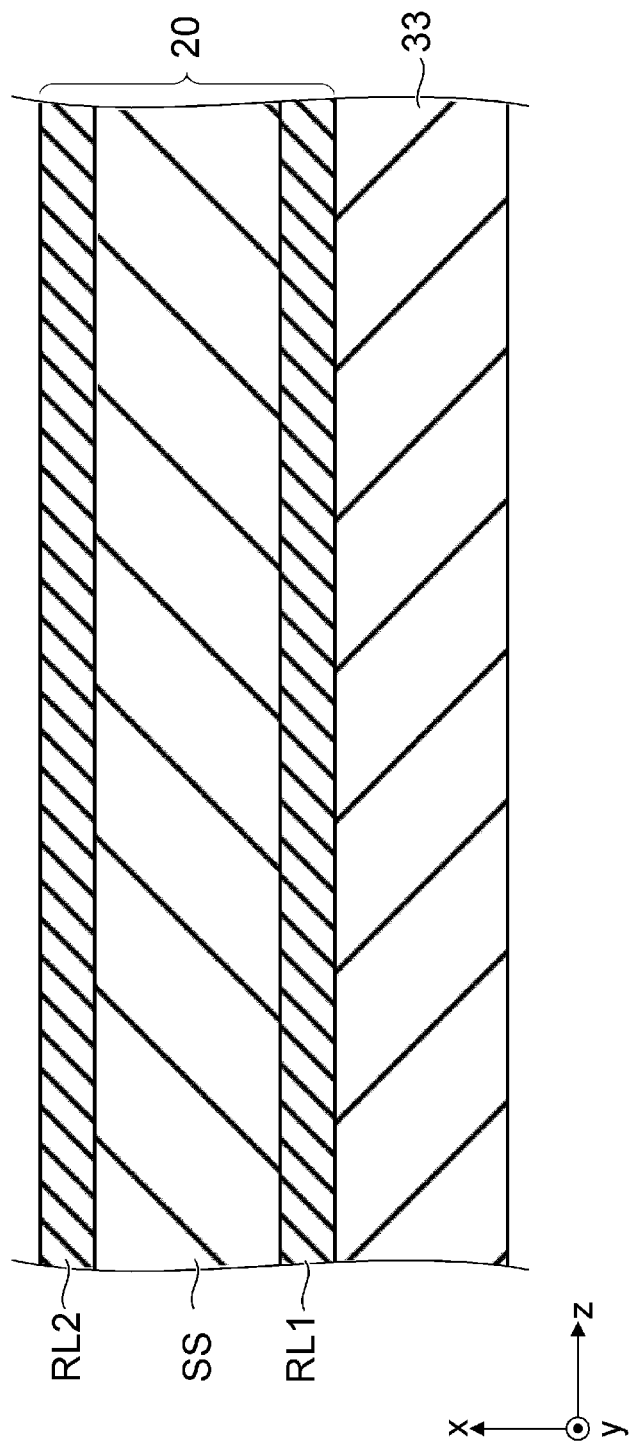
FIG. 7 is a schematic partial cross-sectional diagram of a vehicle structure according to a modified example of the second embodiment.

A vehicle structure according to a modified example of this embodiment will be described hereinafter with reference to FIG. 7. FIG. 7 is a schematic partial cross-sectional diagram of the vehicle structure according to the modified example of the second embodiment. FIG. 7 is a cross-sectional diagram corresponding to FIG. 6.

As shown in FIG. 7, in the vehicle structure according to the modified example, the bumper reinforcement 20, instead of the plate 33 of the crash box 30, is formed of a resin-coated steel plate.

As shown in FIG. 7, in the bumper reinforcement 20, the entire rear surface (the surface on the x-axis negative side) of the steel plate SS is coated with a resin layer RL1, and the entire front surface (the surface on the x-axis positive side) of the steel plate SS is coated with a resin layer RL2. That is, as shown in FIG. 7, the resin layer RL1 is formed on the contact surface of the bumper reinforcement 20 in contact with the plate 33 of the crash box 30.

Therefore, owing to the resin layer RL1, corrosion causing substances such as water, oxygen, and chlorine hardly reach the steel sheet SS of the bumper reinforcement 20, and the plate 33, which is made of a steel plate, so that it is possible to suppress corrosion on the contact surface (assembling surface) between the crash box 30 and the bumper reinforcement 20.

Therefore, by assembling the bumper reinforcement 20 onto the crash box 30 and then electropainting them, it is possible to suppress the corrosion on the contact surface (assembling surface) between them as well as reducing the manufacturing cost.

Note that, in the vehicle structure according to this embodiment, it is sufficient if at least one of the bumper reinforcement 20 and the crash box 30 is formed of a resin-coated steel plate, and a resin layer of this resin-coated steel plate is formed on the contact surface between the bumper reinforcement 20 and the crash box 30. That is, both the bumper reinforcement 20 and the crash box 30 may be formed of a resin-coated steel plate.

However, it is possible to reduce the manufacturing cost by forming only the bumper reinforcement 20 or the crash box 30 from a resin-coated steel plate and forming the other of them from an ordinary steel plate coated with no resin. Further, as shown in FIG. 6, the manufacturing cost can be further reduced by forming only the plate 33 of the crash box 30 from a resin-coated steel plate and forming the main part 31 and the plate 32 from an ordinary steel plate coated with no resin. Note that the main part 31 and plate 32 may also be collectively referred to as a main part.

The rest of the configuration is similar to that of the vehicle structure according to the first embodiment, and therefore the description thereof is omitted.

Note that the first and second embodiment can be combined with each other. That is, a resin layer of a resin-coated steel plate may be formed on the contact surface between the front side member 10 and the crash box 30, and another resin layer of another resin-coated steel plate may be formed on the contact surface between the bumper reinforcement 20 and the crash box 30.

Third Embodiment

Figure 8:
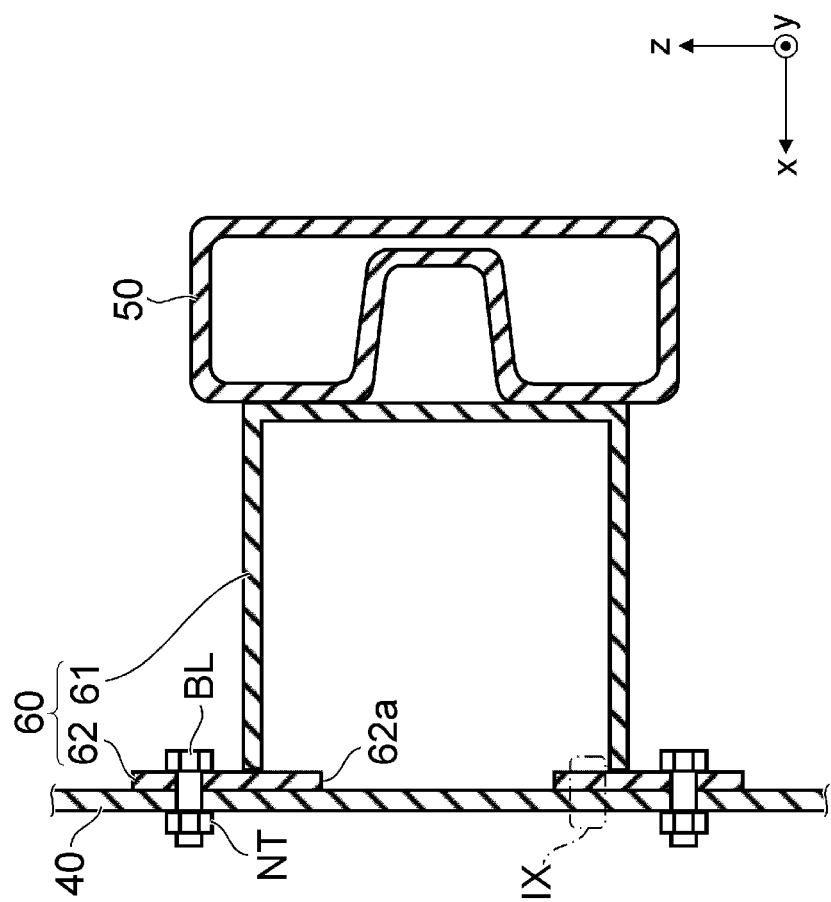
FIG. 8 is a schematic cross-sectional diagram of a vehicle structure according to a third embodiment.

Next, a configuration of a vehicle structure according to a third embodiment will be described with reference to FIG. 8. FIG. 8 is a schematic cross-sectional diagram of the vehicle structure according to the third embodiment.

As shown in FIG. 8, the vehicle structure according to this embodiment includes a lower back panel 40, a bumper reinforcement 50, and a crash box(es) 60 at the rear of the vehicle.

The lower back panel 40 is a steel plate member constituting the rear end face of the body, and extends over the entire width of the body (in the y-axis direction).

The bumper reinforcement 50 is a reinforcing member incorporated into a rear bumper, and is, for example, a cylindrical steel plate member. As shown in FIG. 8, similarly to the bumper reinforcement 20 shown in FIG. 2, the bumper reinforcement 50 has, for example, but is not particularly limited to, a B-shape in the xz-cross section.

Similarly to the crash box 30, the crash box 60 is, for example, a box-shaped or cylindrical steel plate member that absorbs, upon a collision, the shock of the collision as the crash box 60 itself collapses. Although not shown in the drawing, a pair of crash boxes 60 are joined to both ends of the bumper reinforcement 50 in the vehicle width direction (y-axis direction). Further, as shown in FIG. 8, the rear end of each of the crash boxes 60 is joined to the lower back panel 40, which is a part of the body. The rear ends of crash boxes 60 are joined to the front ends of the bumper reinforcement 50. That is, one end of each of the crash boxes 60 is joined to a respective one of the outer ends of the body in the front-rear direction, and the other end thereof is joined to the bumper reinforcements 50.

Note that the crash box 60 shown in FIG. 8 includes, but is not particularly limited to, a cylindrical main part 61 having a bottom, and a plate 62. The front opened end of the main part 61 and the plate 62 are joined to each other, for example, by welding or the like so as to close the front opened end of the main part 61. An opening 62a is formed in the central part of the plate 62. Note that the opening 62a is not indispensable. Further, a part of the plate 62 that extends outward from the opened end of the main part 61 constitutes a flange part of the crash box 60.

Further, as shown in FIG. 8, the front end of the crash box 60, i.e., the plate 62, and the lower back panel 40, which is a part of the body, are joined to each other by bolting or the like. Meanwhile, the rear end of the crash box 60, i.e., the bottom of the main part 61, and the front end of the bumper reinforcement 50 are joined to each other by welding or the like.

Note that in the vehicle structure according to this embodiment, the crash box 60, to which the bumper reinforcement 50 has been joined in advance, is assembled onto and joined to the lower back panel 40, which is a part of the body, by bolting or the like using bolts BL and nuts NT. After that, the body, to which the bumper reinforcement 50 and the crash box 60 have been joined, i.e., the vehicle structure according to this embodiment, is electropainted. After the electropainting, for example, intermediate and final coatings may be applied to the vehicle structure.

Figure 9:
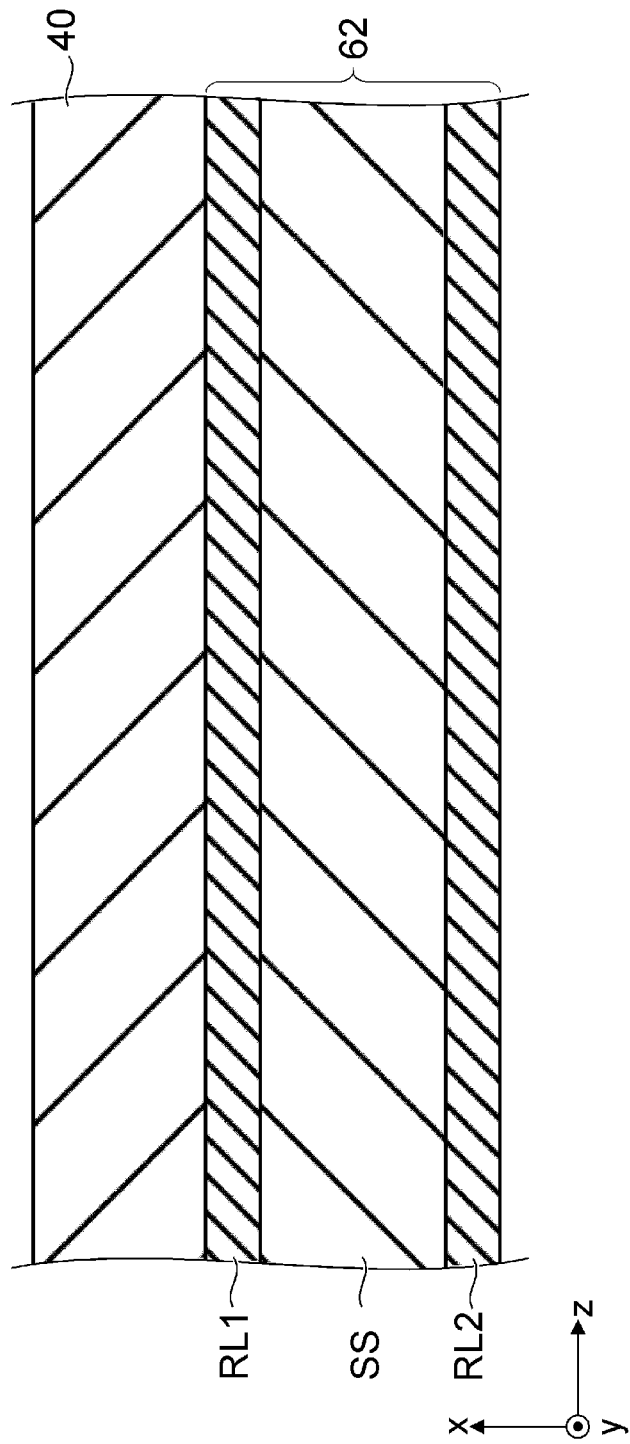
FIG. 9 is a schematic partial cross-sectional diagram of an area IX shown in FIG. 8.

Note that FIG. 9 is a schematic partial cross-sectional diagram of an area IX shown in FIG. 8. As shown in FIG. 9, the plate 62 of the crash box 60 is formed of a resin-coated steel plate. In the plate 62, the entire front surface (the surface on the x-axis positive side) of the steel plate SS is coated with a resin layer RL1, and the entire rear surface (the surface on the x-axis negative side) of the steel plate SS is coated with a resin layer RL2. That is, as shown in FIG. 9, the resin layer RL1 is formed on the contact surface of the plate 62 of the crash box 60 in contact with the lower back panel 40.

Therefore, owing to the resin layer RL1, corrosion causing substances such as water, oxygen, and chlorine hardly reach the steel sheet SS of the plate 62, and the lower back panel 40, which is made of a steel plate, so that it is possible to suppress corrosion on the contact surface (assembling surface) between the crash box 60 and the lower back panel 40 (i.e., the body). When the resin layer RL1 contains a rust-prevention pigment, the corrosion can be further suppressed.

Therefore, by assembling the crash box 60 onto the lower back panel 40 (i.e., the body) and then electropainting them, it is possible to suppress the corrosion on the contact surface (assembling surface) between them as well as reducing the manufacturing cost.

Since the steel plate SS and the resin layers RL1 and RL2 in this embodiment are similar to the steel plate SS and the resin layers RL1 and RL2 in the first embodiment, the detailed description thereof is omitted.

The thicknesses of the resin layers RL1 and RL2 are, for example, roughly equal to each other. However, the thickness of the resin layer RL1 formed on the contact surface of the plate 62 of the crash box 60 in contact with the lower back panel 40 may be larger than that of the resin layer RL2 formed on the surface opposite to the contact surface.

Further, the resin layer RL1 may be formed only on the contact surface of the plate 62 of the crash box 60 in contact with the lower back panel 40, and the resin layer RL2 may not be formed on the surface opposite to the contact surface. By the above-described configuration, it is possible to further reduce the manufacturing cost as well as suppressing the corrosion on the contact surface between the plate 62 of the crash box 60 and the lower back panel 40. Further, as long as the resin layer RL1 is formed on the contact surface of the plate 62 of the crash box 60 in contact with the lower back panel 40, the resin layer RL1 does not necessarily have to be formed on the entire surface of the plate 62 in which the aforementioned contact surface is included.

As described above, in the vehicle structure according to this embodiment, the plate 62 of the crash box 60 is formed of a resin-coated steel plate, and the resin layer RL1 is formed on the contact surface of the plate 62 in contact with the lower back panel 40. Therefore, by assembling the crash box 60 onto the lower back panel 40 (i.e., the body) and then electropainting them, it is possible to suppress the corrosion on the contact surface (assembling surface) between them as well as reducing the manufacturing cost. That is, it is possible to suppress the corrosion as well as reducing the manufacturing cost.

Modified Example

Figure 10:
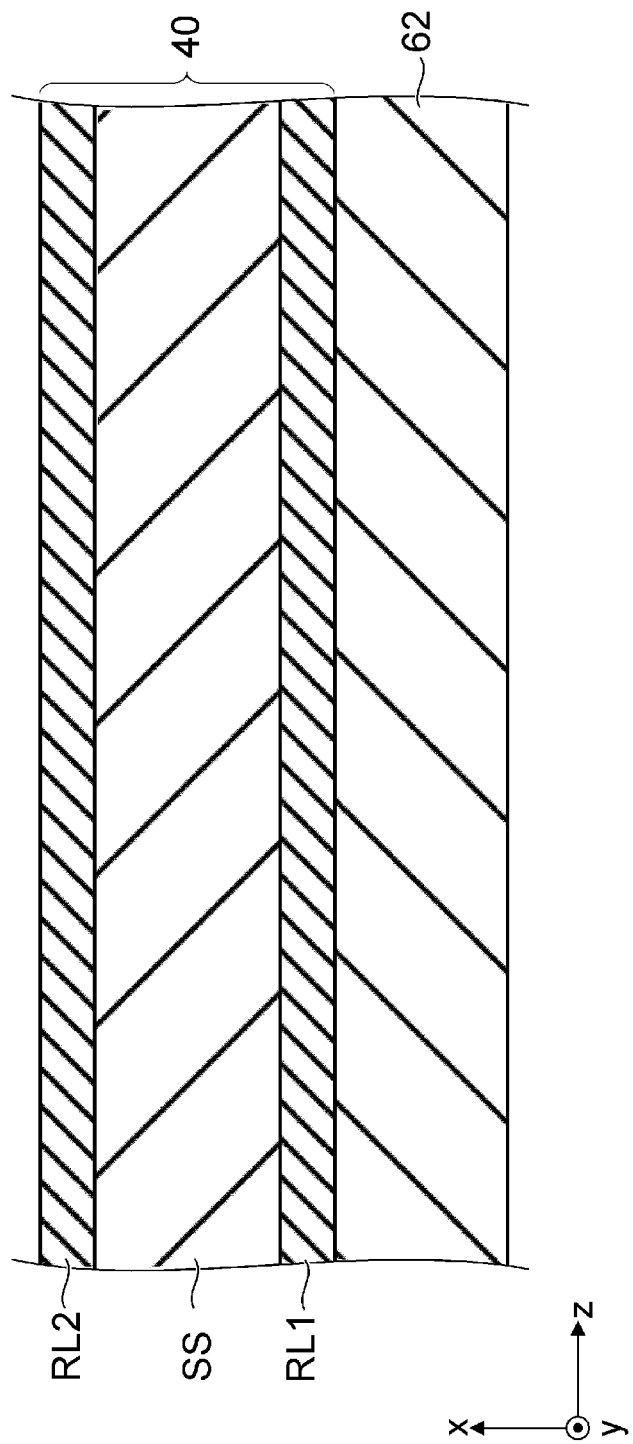
FIG. 10 is a schematic partial cross-sectional diagram of a vehicle structure according to a modified example of the third embodiment.

A vehicle structure according to a modified example of this embodiment will be described hereinafter with reference to FIG. 10. FIG. 10 is a schematic partial cross-sectional diagram of the vehicle structure according to the modified example of the third embodiment. FIG. 10 is a cross-sectional diagram corresponding to FIG. 9.

As shown in FIG. 10, in the vehicle structure according to the modified example, the lower back panel 40, instead of the plate 62 of the crash box 60, is formed of a resin-coated steel plate.

As shown in FIG. 10, in the lower back panel 40, the entire rear surface (the surface on the x-axis negative side) of the steel plate SS is coated with a resin layer RL1, and the entire front surface (the surface on the x-axis positive side) of the steel plate SS is coated with a resin layer RL2. That is, as shown in FIG. 10, the resin layer RL1 is formed on the contact surface of the lower back panel 40 in contact with the plate 62 of the crash box 60.

Therefore, owing to the resin layer RL1, corrosion causing substances such as water, oxygen, and chlorine hardly reach the steel sheet SS of the lower back panel 40, and the plate 62, which is made of a steel plate, so that it is possible to suppress corrosion on the contact surface (assembling surface) between the crash box 60 and the lower back panel 40 (i.e., the body).

Therefore, by assembling the crash box 60 onto the lower back panel 40 (i.e., the body) and then electropainting them, it is possible to suppress the corrosion on the contact surface (assembling surface) between them as well as reducing the manufacturing cost.

Note that, in the vehicle structure according to this embodiment, it is sufficient if at least one of the lower back panel 40 and the crash box 60 is formed of a resin-coated steel plate, and a resin layer of this resin-coated steel plate is formed on the contact surface between the lower back panel 40 and the crash box 60. That is, both the lower back panel 40 and the crash box 60 may be formed of a resin-coated steel plate.

However, it is possible to reduce the manufacturing cost by forming only one of the lower back panel 40 and the crash box 60 from a resin-coated steel plate and forming the other of them from an ordinary steel plate coated with no resin.

Further, as shown in FIG. 9, the manufacturing cost can be further reduced by forming only the plate 62 of the crash box 60 from a resin-coated steel plate and forming the main part 61 from an ordinary steel plate coated with no resin.

Note that this embodiment is combined with one or both of the first and second embodiments.

Fourth Embodiment

Figure 11:
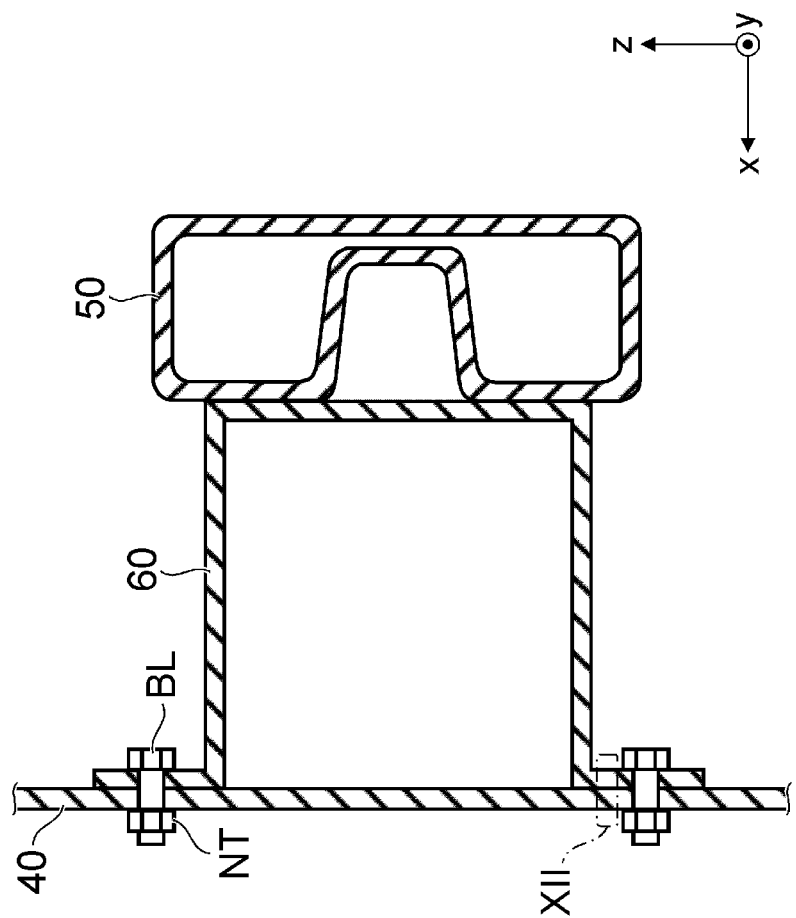
FIG. 11 is a schematic cross-sectional diagram of a vehicle structure according to a fourth embodiment.

Next, a configuration of a vehicle structure according to a fourth embodiment will be described with reference to FIG. 11. FIG. 11 is a schematic cross-sectional diagram of the vehicle structure according to the fourth embodiment. FIG. 11 is a cross-sectional diagram corresponding to FIG. 8.

As shown in FIG. 11, similarly to the vehicle structure according to the third embodiment, the vehicle structure according to this embodiment includes a lower back panel 40, a bumper reinforcement 50, and a crash box(es) 60.

Note that as shown in FIG. 8, in the vehicle structure according to the third embodiment, the crash box 60 includes the cylindrical main part 61 having a bottom, and the plate 62.

In contrast, as shown in FIG. 11, in the vehicle structure according to the fourth embodiment, the crash box 60 is formed of one steel plate. The crash box 60 is a cylindrical component having a bottom, and includes a flange part extending outward from the front opened end.

As shown in FIG. 11, the flange part, which is the front end of the crash box 60, and the lower back panel 40, which is a part of the body, are joined to each other by bolting or the like. Meanwhile, the rear end, i.e., the bottom, of the crash box 60 and the front end of the bumper reinforcement 50 are joined to each other by welding or the like.

Note that in the vehicle structure according to this embodiment, the crash box 60, to which the bumper reinforcement 50 has been joined in advance, is assembled onto and joined to the lower back panel 40, which is a part of the body, by bolting or the like using bolts BL and nuts NT. After that, the body, to which the bumper reinforcement 50 and the crash box 60 have been joined, i.e., the vehicle structure according to this embodiment, is electropainted.

Figure 12:
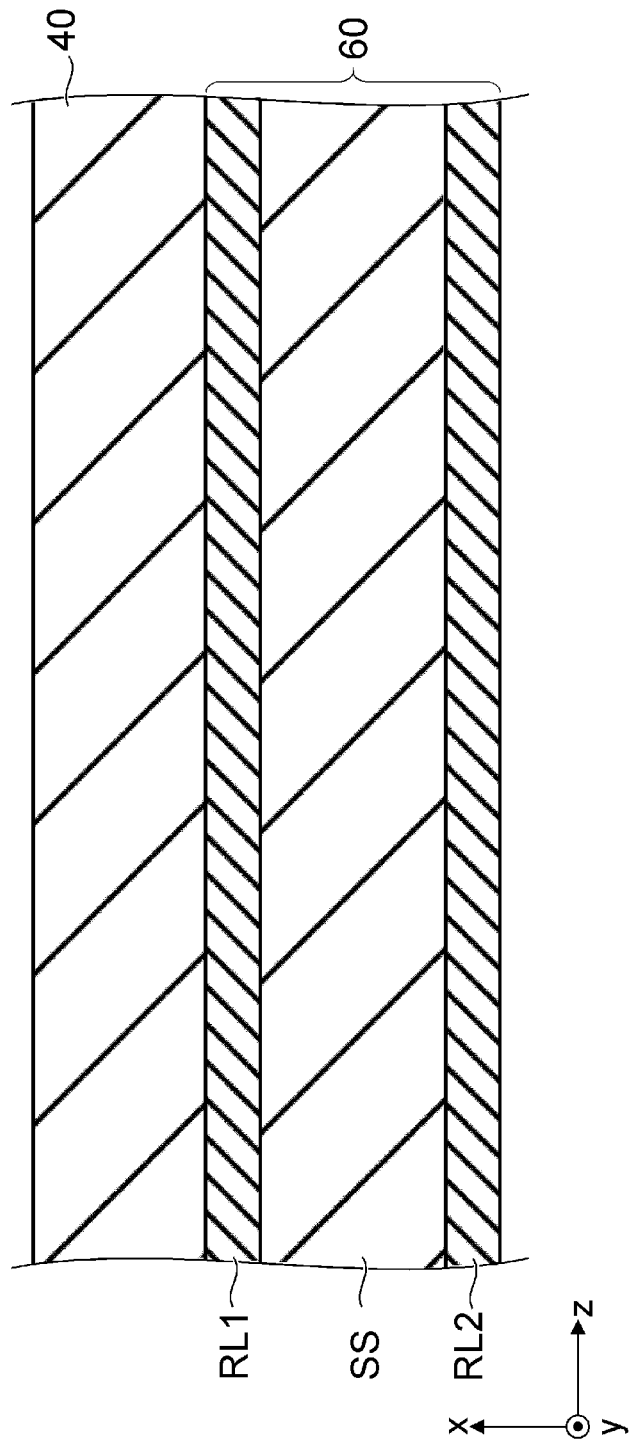
FIG. 12 is a schematic partial cross-sectional diagram of an area XII shown in FIG. 11.

Note that FIG. 12 is a schematic partial cross-sectional diagram of an area XII shown in FIG. 11. As shown in FIG. 12, the crash box 60 is formed of a resin-coated steel plate. In the crash box 60, the entire front surface (the surface on the x-axis positive side) of the steel plate SS is coated with a resin layer RL1, and the entire rear surface (the surface on the x-axis negative side) of the steel plate SS is coated with a resin layer RL2. That is, as shown in FIG. 12, the resin layer RL1 is formed on the contact surface of the crash box 60 in contact with the lower back panel 40.

Therefore, owing to the resin layer RL1, corrosion causing substances such as water, oxygen, and chlorine hardly reach the steel sheet SS of the crash box 60, and the lower back panel 40, which is made of a steel plate, so that it is possible to suppress corrosion on the contact surface (assembling surface) between the crash box 60 and the lower back panel 40.

Therefore, by assembling the crash box 60 onto the lower back panel 40 (i.e., the body) and then electropainting them, it is possible to suppress the corrosion on the contact surface (assembling surface) between them as well as reducing the manufacturing cost.

The thicknesses of the resin layers RL1 and RL2 are, for example, roughly equal to each other. However, the thickness of the resin layer RL1 formed on the contact surface of the crash box 60 in contact with the lower back panel 40 may be larger than that of the resin layer RL2 formed on the surface opposite to the contact surface.

Further, the resin layer RL1 may be formed only on the contact surface of the crash box 60 in contact with the lower back panel 40, and the resin layer RL2 may not be formed on the surface opposite to the contact surface. By the above-described configuration, it is possible to further reduce the manufacturing cost as well as suppressing the corrosion on the contact surface between the crash box 60 of the lower back panel 40.

Further, as long as the resin layer RL1 is formed on the contact surface of the crash box 60 in contact with the lower back panel 40, the resin layer RL1 does not necessarily have to be formed on the entire surface of the crash box 60 in which the aforementioned contact surface is included.

As described above, in the vehicle structure according to this embodiment, the crash box 60 is formed of a resin-coated steel plate, and the resin layer RL1 is formed on the contact surface of the crash box 60 in contact with the lower back panel 40. Therefore, by assembling the crash box 60 onto the lower back panel 40 (i.e., the body) and then electropainting them, it is possible to suppress the corrosion on the contact surface (assembling surface) between them as well as reducing the manufacturing cost. That is, it is possible to suppress the corrosion as well as reducing the manufacturing cost.

Note that, in the vehicle structure according to this embodiment, it is sufficient if at least one of the lower back panel 40 and the crash box 60 is formed of a resin-coated steel plate, and a resin layer of this resin-coated steel plate is formed on the contact surface between the lower back panel 40 and the crash box 60. That is, both the bumper reinforcement 20 and the crash box 30 may be formed of a resin-coated steel plate.

However, it is possible to reduce the manufacturing cost by forming only one of the lower back panel 40 and the crash box 60 from a resin-coated steel plate and forming the other of them from an ordinary steel plate coated with no resin. Further, only the flange part of the crash box 60 may be formed of a resin-coated steel plate and the rest of the crash box 60 may be formed of an ordinary steel plate coated with no resin.

The rest of the configuration is similar to that of the vehicle structure according to the third embodiment, and therefore the description thereof is omitted.

Fifth Embodiment

Figure 13:
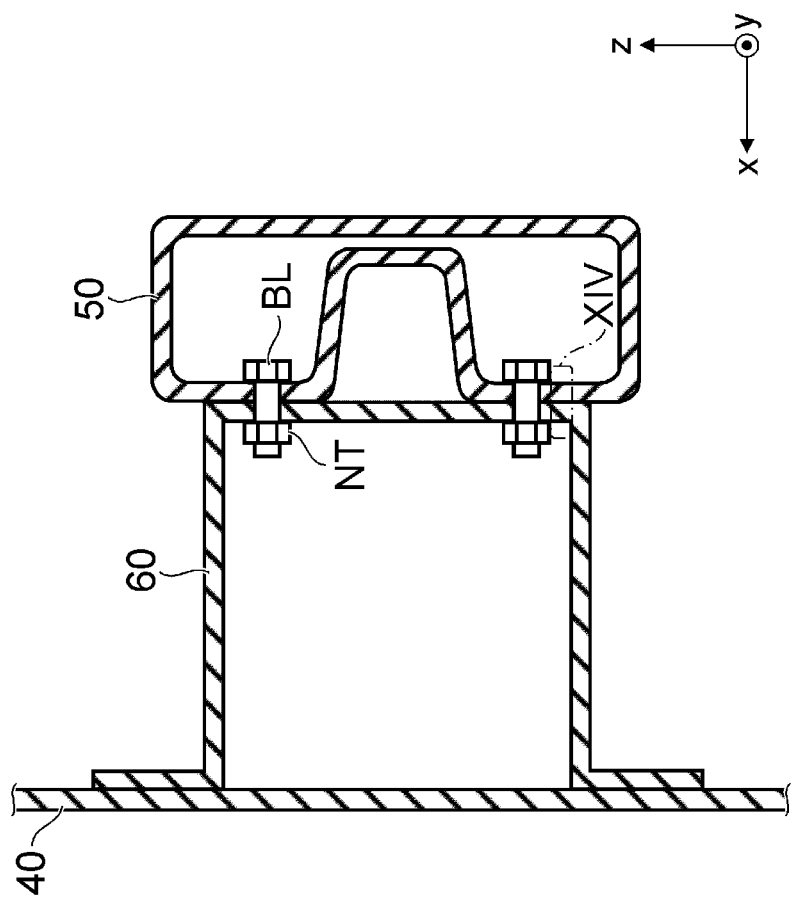
FIG. 13 is a schematic cross-sectional diagram of a vehicle structure according to a fifth embodiment.

Next, a configuration of a vehicle structure according to a fifth embodiment will be described with reference to FIG. 13. FIG. 13 is a schematic cross-sectional diagram of the vehicle structure according to the fifth embodiment. FIG. 13 is a cross-sectional diagram corresponding to FIG. 11.

As shown in FIG. 13, similarly to the vehicle structure according to the fourth embodiment, the vehicle structure according to this embodiment includes a front side member(s) 10, a bumper reinforcement 20, and a crash box(es) 30.

Note that as shown in FIG. 11, in the vehicle structure according to the fourth embodiment, the flange part, which is the front end of the crash box 60, and the lower back panel 40, which is a part of the body, are joined to each other by bolting or the like. Meanwhile, the rear end, i.e., the bottom, of the crash box 60 and the front end of the bumper reinforcement 50 are joined to each other by welding or the like.

That is, in the vehicle structure according to the fourth embodiment, the crash box 60, to which the bumper reinforcement 50 has been joined in advance, is assembled onto and joined to the lower back panel 40, which is a part of the body, by bolting or the like using bolts BL and nuts NT. After that, the body, to which the bumper reinforcement 50 and the crash box 60 have been joined, i.e., the vehicle structure according to this embodiment, is electropainted.

In contrast, as shown in FIG. 13, in the vehicle structure according to the fifth embodiment, the front end, i.e., the flange part, of the crash box 60 and the lower back panel 40, which is a part of the body, are joined to each other by welding or the like. Meanwhile, the rear end, i.e., the bottom, of the crash box 60 and the front end of the bumper reinforcement 50 are joined to each other by bolting or the like.

That is, in the vehicle structure according to this embodiment, the bumper reinforcement 50 is assembled onto and joined to the crash box 60, which has been joined to the lower back panel 40 (i.e., the body) in advance, by bolting or the like using bolts BL and nuts NT. After that, the body, to which the bumper reinforcement 50 and the crash box 60 have been joined, i.e., the vehicle structure according to this embodiment, is electropainted.

Figure 14:
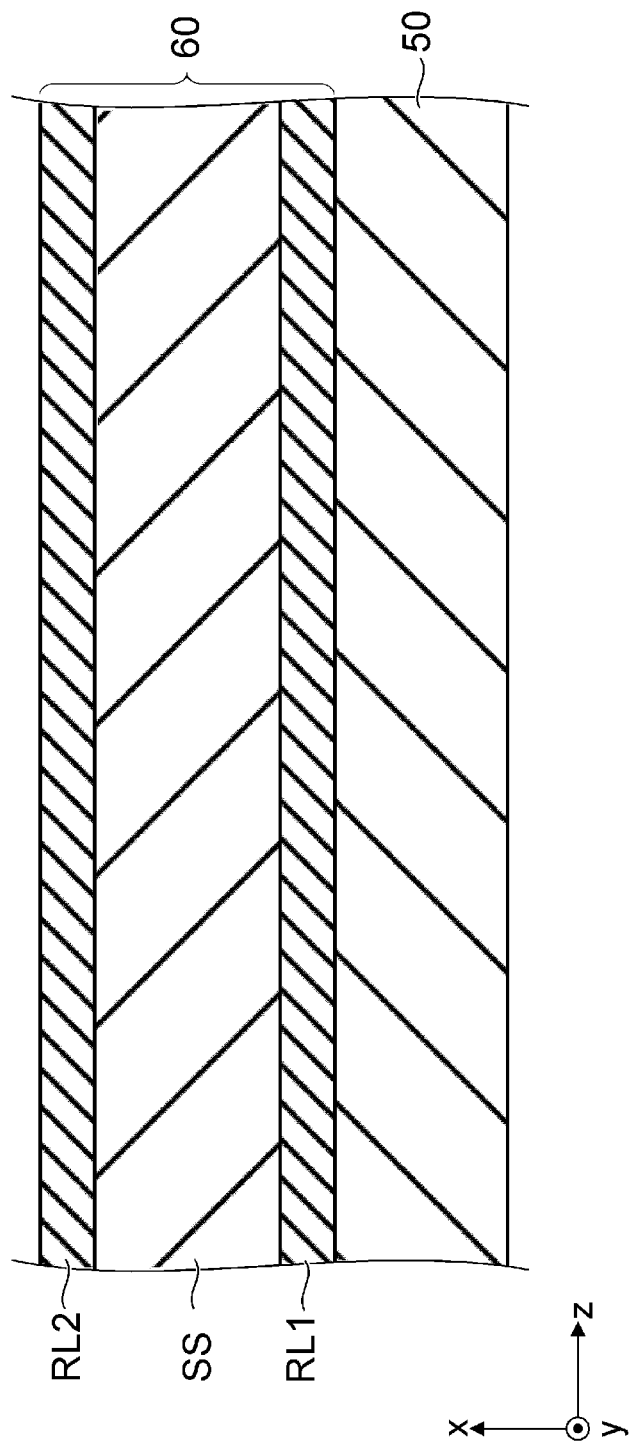
FIG. 14 is a schematic partial cross-sectional diagram of an area XIV shown in FIG. 13.

Note that FIG. 14 is a schematic partial cross-sectional diagram of an area XIV shown in FIG. 13. As shown in FIG. 14, the crash box 60 is formed of a resin-coated steel plate. In the crash box 60, the entire rear surface (the surface on the x-axis negative side) of the steel plate SS is coated with a resin layer RL1, and the entire front surface (the surface on the x-axis positive side) of the steel plate SS is coated with a resin layer RL2. That is, as shown in FIG. 14, the resin layer RL1 is formed on the contact surface of the crash box 60 in contact with the bumper reinforcement 50.

Therefore, owing to the resin layer RL1, corrosion causing substances such as water, oxygen, and chlorine hardly reach the steel sheet SS of the crash box 60, and the bumper reinforcement 50, which is made of a steel plate, so that it is possible to suppress corrosion on the contact surface (assembling surface) between the crash box 60 and the bumper reinforcement 50.

Therefore, by assembling the bumper reinforcement 50 onto crash box 60 and then electropainting them, it is possible to suppress the corrosion on the contact surface (assembling surface) between them as well as reducing the manufacturing cost.

The thicknesses of the resin layers RL1 and RL2 are, for example, roughly equal to each other. However, the thickness of the resin layer RL1 formed on the contact surface of the crash box 60 in contact with the bumper reinforcement 50 may be larger than that of the resin layer RL2 formed on the surface opposite to the contact surface.

Further, the resin layer RL1 may be formed only on the contact surface of the crash box 60 in contact with the bumper reinforcement 50, and the resin layer RL2 may not be formed on the surface opposite to the contact surface. By the above-described configuration, it is possible to further reduce the manufacturing cost as well as suppressing the corrosion on the contact surface between the crash box 60 of the bumper reinforcement 50.

Further, as long as the resin layer RL1 is formed on the contact surface of the crash box 60 in contact with the bumper reinforcement 50, the resin layer RL1 does not necessarily have to be formed on the entire surface of the crash box 60 in which the aforementioned contact surface is included.

As described above, in the vehicle structure according to this embodiment, the crash box 60 is formed of a resin-coated steel plate, and the resin layer RL1 is formed on the contact surface of the crash box 60 in contact with the bumper reinforcement 50. Therefore, by assembling the bumper reinforcement 50 onto the crash box 60 and then electropainting them, it is possible to suppress the corrosion on the contact surface (assembling surface) between them as well as reducing the manufacturing cost. That is, it is possible to suppress the corrosion as well as reducing the manufacturing cost.

Modified Example

Figure 15:
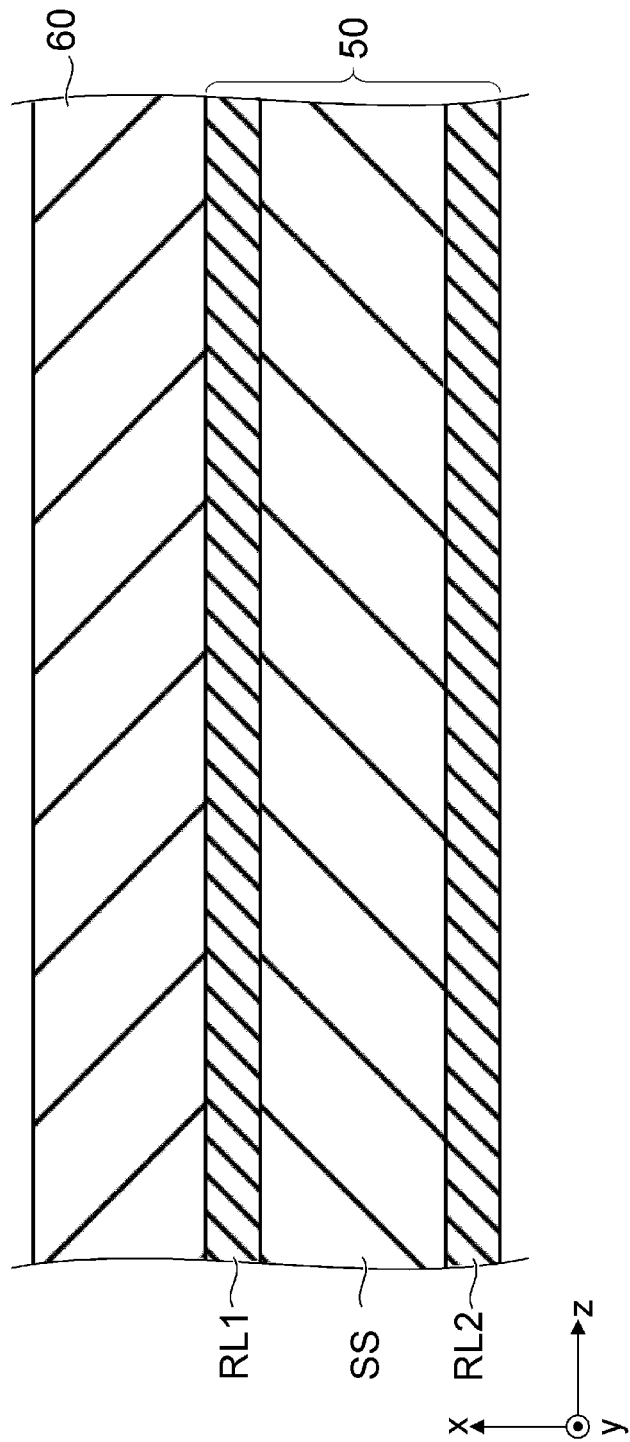
FIG. 15 is a schematic partial cross-sectional diagram of a vehicle structure according to a modified example of the fifth embodiment.

A vehicle structure according to a modified example of this embodiment will be described hereinafter with reference to FIG. 15. FIG. 15 is a schematic partial cross-sectional diagram of the vehicle structure according to the modified example of the fifth embodiment. FIG. 15 is a cross-sectional diagram corresponding to FIG. 14.

As shown in FIG. 15, in the vehicle structure according to the modified example, the bumper reinforcement 50, instead of the crash box 60, is formed of a resin-coated steel plate.

As shown in FIG. 15, in the bumper reinforcement 50, the entire front surface (the surface on the x-axis positive side) of the steel plate SS is coated with a resin layer RL1, and the entire rear surface (the surface on the x-axis negative side) of the steel plate SS is coated with a resin layer RL2. That is, as shown in FIG. 15, the resin layer RL1 is formed on the contact surface of the bumper reinforcement 50 in contact with the crash box 60.

Therefore, owing to the resin layer RL1, corrosion causing substances such as water, oxygen, and chlorine hardly reach the steel sheet SS of the bumper reinforcement 50, and the crash box 60, which is made of a steel plate, so that it is possible to suppress corrosion on the contact surface (assembling surface) between the crash box 60 and the bumper reinforcement 50.

Therefore, by assembling the bumper reinforcement 50 onto the crash box 60 and then electropainting them, it is possible to suppress the corrosion on the contact surface (assembling surface) between them as well as reducing the manufacturing cost.

Note that, in the vehicle structure according to this embodiment, it is sufficient if at least one of the bumper reinforcement 50 and the crash box 60 is formed of a resin-coated steel plate, and a resin layer of this resin-coated steel plate is formed on the contact surface between the bumper reinforcement 50 and the crash box 60. That is, both the bumper reinforcement 50 and the crash box 60 may be formed of a resin-coated steel plate.

However, it is possible to reduce the manufacturing cost by forming only one of the bumper reinforcement 50 and the crash box 60 from a resin-coated steel plate and forming the other of them from an ordinary steel plate coated with no resin. Further, only the bottom of the crash box 60 may be formed of a resin-coated steel plate and the rest of the crash box 60 may be formed of an ordinary steel plate coated with no resin.

The rest of the configuration is similar to that of the vehicle structure according to the fourth embodiment, and therefore the description thereof is omitted.

Note that the fourth and fifth embodiments can be combined with each other. That is, a resin layer of a resin-coated steel plate may be formed on the contact surface between the lower back panel 40 and the crash box 60, and another resin layer of another resin-coated steel plate may be formed on the contact surface between the bumper reinforcement 50 and the crash box 60.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vehicle structure comprising:
a body;
a bumper reinforcement disposed at a front or a rear of the body; and
a crash box, a first end of the crash box being joined to an outer end of the body in a front-rear direction of the body and a second end of the crash box, opposite the first end of the crash box, being joined to the bumper reinforcement, wherein
of the body and the crash box which are joined together, only the crash box is formed of a resin-coated steel plate,
the crash box comprises a main part, one end of the main part located at the second end of the crash box is joined to the bumper reinforcement, and an other end of the main part, opposite the one end of the main part, is located at the first end of the crash box and includes the resin-coated steel plate which is joined to the body,
in the crash box, only the resin-coated steel plate is coated with a resin layer, the resin layer of the resin-coated steel plate is formed on a contact surface of the resin-coated steel plate which contacts with the body, and no resin layer is formed on a surface of the resin-coated steel plate that faces in an opposite direction of the contact surface, and
the resin layer includes a rust-prevention pigment.

2. A vehicle structure comprising:
a body;
a bumper reinforcement disposed at a front or a rear of the body; and
a crash box, a first end of the crash box being joined to an outer end of the body in a front-rear direction of the body and a second end of the crash box, opposite the first end of the crash box, being joined to the bumper reinforcement, wherein
of the bumper reinforcement and the crash box which are joined together, only the crash box is formed of a resin-coated steel plate,
the crash box comprises a main part, one end of the main part located at the first end of the crash box is joined to the body, and an other end of the main part, opposite the one end of the main part, is located at the second end of the crash box and includes the resin-coated steel plate which is joined to the bumper reinforcement,
in the crash box, only the resin-coated steel plate is coated with a resin layer, the resin layer of the resin-coated steel plate is formed on a contact surface of the resin-coated steel plate which contacts with the bumper reinforcement, and no resin layer is formed on a surface of the resin-coated steel plate that faces in an opposite direction of the contact surface, and
the resin layer includes a rust-prevention pigment.

3. A method for manufacturing a vehicle, comprising electropainting a crash box together with a body and a bumper reinforcement, a second end of the crash box being joined to the bumper reinforcement and a first end of the crash box, opposite the second end of the crash box, being joined to the body, wherein
of the body and the crash box which are joined together, only the crash box is formed of a resin-coated steel plate,
the crash box comprises a main part, one end of the main part located at the second end of the crash box is joined to the bumper reinforcement, and an other end of the main part, opposite the one end of the main part, is located at the first end of the crash box and includes the resin-coated steel plate which is joined to the body,
in the crash box, only the resin-coated steel plate is coated with a resin layer, the resin layer of the resin-coated steel plate is formed on a contact surface of the resin-coated steel plate which contacts with the body, and no resin layer is formed on a surface of the resin-coated steel plate that faces in an opposite direction of the contact surface, and the resin layer includes a rust-prevention pigment.

\* \* \* \* \*